United States Patent
Lee et al.

(10) Patent No.: US 9,110,208 B2
(45) Date of Patent: Aug. 18, 2015

(54) AUTOSTEREOSCOPIC THREE-DIMENSIONAL IMAGE DISPLAY DEVICE

(71) Applicants: Eun Gon Lee, Uiwang-si (KR); Dong Ho Wee, Uiwang-si (KR)

(72) Inventors: Eun Gon Lee, Uiwang-si (KR); Dong Ho Wee, Uiwang-si (KR)

(73) Assignee: CHEIL INDUSTRIES, INC., Gumi-si, Kyeongsangbuk-do (KR)

( * ) Notice: Subject to any disclaimer, the term of this patent is extended or adjusted under 35 U.S.C. 154(b) by 254 days.

(21) Appl. No.: 13/899,644

(22) Filed: May 22, 2013

(65) Prior Publication Data

US 2013/0250427 A1  Sep. 26, 2013

Related U.S. Application Data

(63) Continuation of application No. PCT/KR2011/004625, filed on Jun. 24, 2011.

(30) Foreign Application Priority Data

Nov. 23, 2010 (KR) .................. 10-2010-0116921

(51) Int. Cl.
G02B 27/10 (2006.01)
G02B 3/00 (2006.01)
G02B 27/22 (2006.01)

(52) U.S. Cl.
CPC .............. *G02B 3/005* (2013.01); *G02B 27/225* (2013.01)

(58) Field of Classification Search
CPC .......... H04N 13/0418; H04N 13/0411; H04N 13/0402; H04N 2013/0465; H04N 13/0018; H04N 13/00; H04N 9/3197; G02F 1/133615; G02B 27/2214; G02B 27/225; G02B 6/0068; G02B 27/22; G02B 6/0053; G02B 6/003; G02B 6/00915
USPC .......................... 359/625–627, 618, 622, 638
See application file for complete search history.

(56) References Cited

U.S. PATENT DOCUMENTS 1,883,291 A  10/1932 Ives
6,046,849 A  4/2000 Moseley et al.
(Continued)

FOREIGN PATENT DOCUMENTS

JP  2003-337226 A  11/2003
JP  2004-279815 A  10/2004
(Continued)

OTHER PUBLICATIONS

International Search Report issued in corresponding application, PCT/KR2011/004625, dated Feb. 10, 2012.

*Primary Examiner* — Alicia M Harrington
(74) *Attorney, Agent, or Firm* — Lee & Morse, P.C.

(57) ABSTRACT

An autostereoscopic three-dimensional image display device including a first light guide plate having a first surface and a second surface, the second surface being provided with a first prism changing a path of light input from a first light source on a side of the first light guide plate toward the first surface; a second light guide plate having a third surface and a fourth surface, the fourth surface being provided with a second prism changing a path of light from a second light source on a side of the second light guide plate toward the third surface; a barrier film between the first and second light guide plates and interrupting part of light from the first light guide plate; and a lenticular film above the third surface of the second light guide plate and refracting a path of light input from the second light guide plate.

21 Claims, 6 Drawing Sheets

(56) References Cited

U.S. PATENT DOCUMENTS 7,916,221 B2  3/2011  Daiku
2009/0067156 A1 *  3/2009  Bonnett et al. ............... 362/97.2

FOREIGN PATENT DOCUMENTS

JP        2008-077946 A    4/2008
KR    10-2007-0036702 A    4/2007

* cited by examiner (A)

(B)

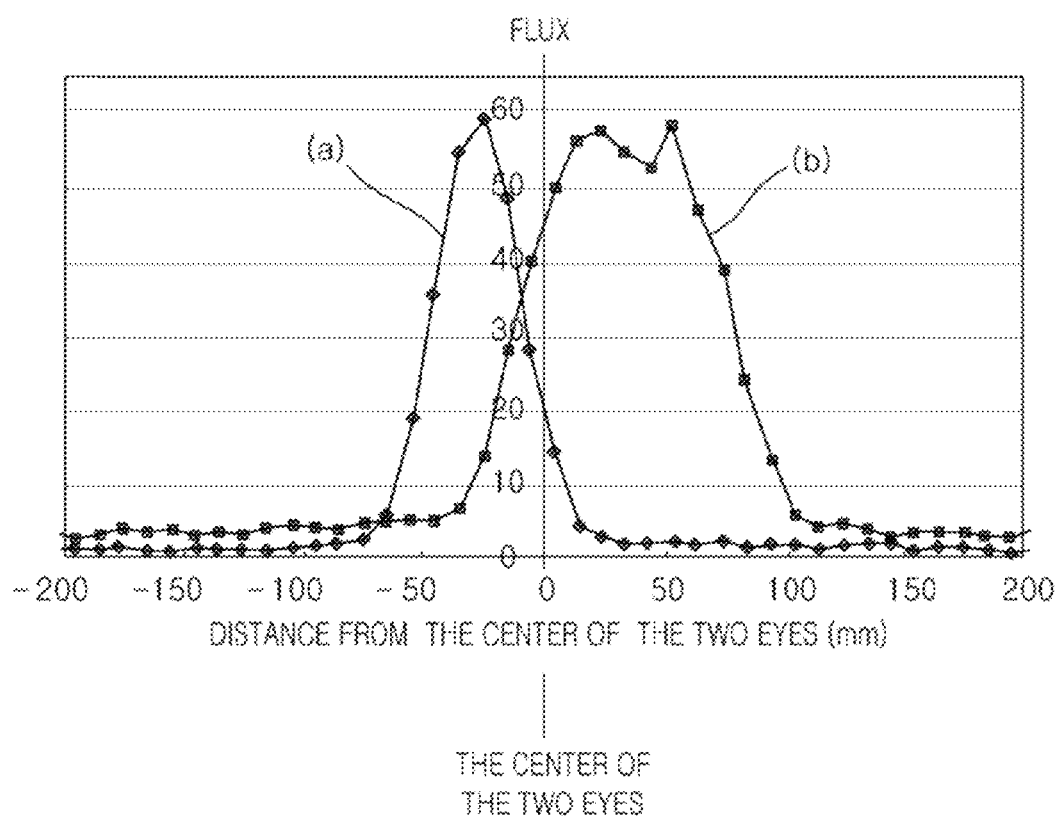

AUTOSTEREOSCOPIC THREE-DIMENSIONAL IMAGE DISPLAY DEVICE

CROSS-REFERENCE TO RELATED APPLICATION

Korean Patent Application No. 10-2010-0116921 filed on Nov. 23, 2010, in the Korean Intellectual Property Office, and entitled: "AUTOSTEREOSCOPIC THREE-DIMENSIONAL IMAGE DISPLAY DEVICE," is incorporated by reference herein in its entirety.

This application is a continuation of pending International Application No. PCT/KR2011/004625, entitled "AUTOSTEREOSCOPIC THREE-DIMENSIONAL IMAGE DISPLAY DEVICE," which was filed on Jun. 24, 2011, the entire contents of which are hereby incorporated by reference.

BACKGROUND

1. Field

Embodiments relate to an autostereoscopic three-dimensional image display device.

2. Description of the Related Art

Three-dimensional (3D) display devices may display images with a 3D effect (depth feeling) to users. 3D display devices have attracted attention as next generation display devices capable of replacing flat panel displays (FPDs). However, since the current flat panel displays may display visual images only on 2-dimensional planes, e.g., display planes thereof, they may have a limit in display of the 3D effect of images.

SUMMARY

Embodiments are directed to an autostereoscopic three-dimensional image display device.

The embodiments may be realized by providing an autostereoscopic three-dimensional image display device including a first light guide plate having a first surface and a second surface opposite to the first surface, the second surface being provided with a first prism that changes a path of light input from a first light source on a lateral side of the first light guide plate toward the first surface; a second light guide plate having a third surface and a fourth surface opposite to the third surface, the fourth surface being provided with a second prism that changes a path of light input from a second light source on a lateral side of the second light guide plate toward the third surface; a barrier film between the first light guide plate and the second light guide plate, the barrier film interrupting part of light from the first light guide plate; and a lenticular film above the third surface of the second light guide plate, the lenticular film refracting a path of light from the second light guide plate.

The fourth surface may include a prism section having one or more second prisms, and a space section having no second prism.

A number of second prisms in the prism section may be from 1 to 9.

The barrier film may include a periodically repeated structure of alternating barrier layers and transmittance regions.

The prism section may have a length of about 1% to about 50% of a barrier pitch of the barrier film.

The barrier layers may have a length of about 30% to about 75% of a barrier pitch of the barrier film.

The space section may have a length of about 1 to about 10 times a barrier pitch of the barrier film.

The lenticular film may include lenticular lenses having a pitch PL represented by Equation 1:

$$P_L = P_B \pm D, \quad \text{[Equation 1]}$$

where $P_B$=a barrier pitch of the barrier film and D=$P_B$/2×(a total number of lenticular lenses).

The barrier film may include a base substrate, and a reflective layer on the base substrate.

The barrier film may have a barrier layer coated on the first surface of the first light guide plate.

The second prism may include a plurality of second prisms, the plurality of second prisms having a pitch of about 0.01 mm to about 0.1 mm.

The first prism or the second prism may have an apex angle of about 60 to 100 degrees.

The first prism and the second prism may have a same shape.

The barrier film may include a reflective layer, the reflective layer being a multilayered reflective layer in which a metal reflective layer or an oxide film of high refractivity and an oxide film of low refractivity are alternately stacked.

The first light source or the second light source may be a light emitting diode or a cold cathode fluorescent lamp.

The autostereoscopic three-dimensional image display device may further include a liquid crystal panel above the lenticular film.

The first prism or the second prism may have a bottom side having a length of about 0.02 mm to 0.06 mm.

The lenticular film may include lenticular lenses having a radius R represented by Equation 2:

$$R = \frac{h^2 + (P_L/2)^2}{2h} \quad \text{[Equation 2]}$$

where $P_L$ is a pitch between the lenticular lenses and h is a height of the lenticular lenses.

The lenticular film may include lenticular lenses having a ratio $h/P_L$ of a height to a pitch of about 0.13 to about 0.27.

The lenticular film may include lenticular lenses having a ratio $R/P_L$ of a radius to a pitch of about 0.6 to about 1.0.

The barrier film may have a barrier pitch of about 0.5 mm to 1.0 mm.

BRIEF DESCRIPTION OF THE DRAWINGS

Features will become apparent to those of skill in the art by describing in detail exemplary embodiments with reference to the attached drawings in which:

FIG. 8 illustrates a graph depicting a final visual field of an autostereoscopic three-dimensional display according to an embodiment.

DETAILED DESCRIPTION

Figure 1:
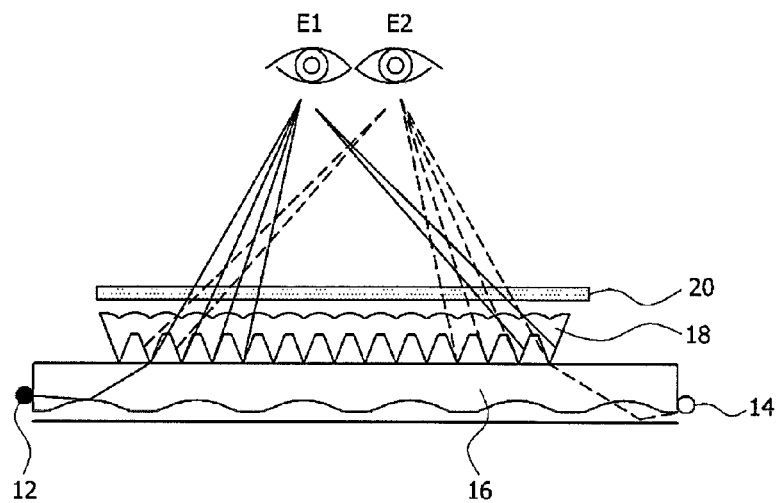
FIG. 1 illustrates a conceptual view of an operation principle of one type of three-dimensional display device.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art. Like reference numerals refer to like elements throughout.

Figure 2:
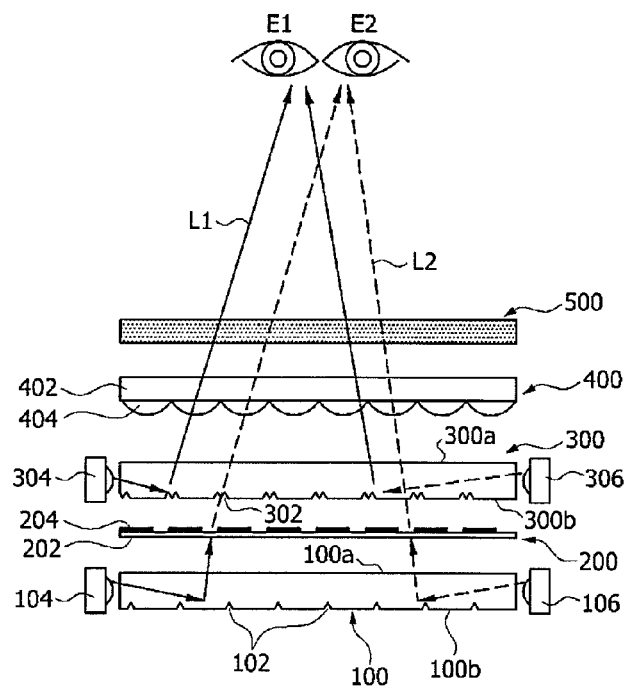
FIG. 2 illustrates a schematic sectional view of an autostereoscopic three-dimensional display device according to an embodiment.

FIG. 2 illustrates a schematic sectional view of a principle of an autostereoscopic three-dimensional display device according to an embodiment. As shown in FIG. 2, the autostereoscopic three-dimensional display device of the embodiment may include a first light guide plate 100, a barrier film 200, a second light guide plate 300, and a lenticular film 400. In the following description, for convenience of explanation, a left eye E1, a right eye E2, light L1 for a left visual field, and light L2 for a right visual field will be named with reference to the left and right of the drawings, but may not coincide with the left eye and the right eye of an observer.

The first light guide plate 100 may have a first surface 100a and a second surface 100b opposite to the first surface 100a, and first prisms 102 (which change a path of light input from first light sources 104, 106 on lateral sides of the first light guide plate 100 toward the first surface 100a) may be formed at the second surface 100b to form a first prism pattern. A shape and/or array of the first prisms 102 may be set or selected to allow light input from the first light sources 104, 106 to exit from the first light guide plate 100 in a vertically upward direction (of FIG. 2) such that the light passes through the lenticular film 400 to form light L2 for the right visual field which forms an image in the right eye E2. For example, the first prisms 102 may be regularly arranged at constant intervals. Alternatively, light L1 for the left visual field may be formed by light exiting from the first light sources 104, 106 and the first light guide plate 100.

The first light guide plate 100 may have or may not have a constant thickness. In an implementation, the first light guide plate 100 may have a thickness of several millimeters, without being limited thereto. The first light guide plate 100 may be manufactured through injection molding or extruding a transparent resin, e.g., polymethyl methacrylate (PMMA), without being limited thereto.

In an implementation, the first light guide plate 100 may be turned over (e.g., with respect to the arrangement illustrated in FIG. 2). For example, the first light guide plate 100 may be disposed such that the first surface 100a is placed on or faces a lower side of FIG. 2. In this case, a reflection plate may be disposed below the first light guide plate 100 such that light emitted from the first light sources 104, 106 may be refracted downwardly by the first prisms 102 and then may be reflected upwardly (toward the barrier film) by the reflection plate to form light L2 for the right visual field.

The second light guide plate 300 may have a third surface 300a and a fourth surface 300b opposite to the third surface 300a, and second prisms 302 (which change a path of light input from second light sources 304, 306 on lateral sides of the second light guide plate 300 toward the third surface 300a) may be formed on the fourth surface 300b. Light emitted from the second light sources 304, 306 may enter the second light guide plate 300 and may be subjected to refraction and total reflection. For example, light colliding with the second prisms 302 of the second light guide plate 300 towards the upper side (toward the lenticular film) may travel nearly vertically upward and may be refracted by lenticular lenses 404 of the lenticular film 400 to form light L1 for the left visual field and enter the left eye E1.

The second light guide plate 300 may have or may not have a constant thickness. In an implementation, the second light guide plate 300 may have a thickness of several millimeters, without being limited thereto. The second light guide plate 300 may be manufactured through injection molding or extruding a transparent resin, e.g., polymethyl methacrylate (PMMA), without being limited thereto. In an implementation, the first and the second light guide plates 100, 300 may have the same or different thicknesses, and may be formed of the same or different materials.

The barrier film 200 may be disposed between the first and the second light guide plates 100, 300 and may block a portion of light exiting from the first light guide plate 100. The barrier film 200 may have a structure in which barrier layers 204 are coated (deposited) on a base substrate 202 and an alternating pattern of the barrier layers 204 (interrupting light) and transmittance regions (transmitting light) between the barrier layers 204 may be periodically repeated. The barrier layers 204 may be absorption layers (that absorb light exiting from the first light guide plate 100) or reflective layers (that reflect the light exiting from the first light guide plate 100). In an implementation, the barrier layers 204 may be the reflective layers. The barrier layers 204 may be formed by, e.g., sputtering, vacuum evaporation, or chemical vapor deposition. The reflective layers may have a single layer or multilayer structure formed of a metallic material, e.g., gold, silver, and/or aluminum, and/or may be a multilayered thin film in which an oxide film of high refractivity and an oxide film of low refractivity are stacked a plurality of times. The oxide film may be formed of, e.g., titanium dioxide ($TiO_2$), silicon dioxide ($SiO_2$), and/or tantalum pentoxide ($Ta_2O_5$), without being limited thereto. The reflective layers preferably have a reflectivity of about 90% or more.

The base substrate 202 may be formed of a plastic material having excellent visible light transmittance. For example, the plastic material may include polyethylene, polypropylene, ethylene/propylene copolymer, polybutene-1, ethylene/vinyl acetate copolymer, a mixture of polyethylene/styrene butadiene rubber, polyvinyl chloride, polyethylene terephthalate, polycarbonate, and/or polymethyl methacrylate, without being limited thereto.

The first light sources 104, 106 may be disposed on one or both sides of the first light guide plate 100, and the second light sources 304, 306 may be disposed on one or both sides of the second light guide plate 300. The first light sources 104, 106, and the second light sources 304, 306 may be, e.g., light emitting diodes and/or cold cathode fluorescent lamps (CCFLs).

The lenticular film 400 may be a film including the lenticular lenses 404 on a base film 402, and may refract light exiting the second light guide plate 300 vertically upward, thereby focusing the light on the left eye E1 and the right eye E2. In other words, as will be apparent to a person of ordinary skill in the art from the foregoing description and from the drawings, the lenticular film 400 may be above the third surface 300a of the second light guide plate 300, e.g., the lenticular film 400 may be between the third surface 300a of the second light guide plate 300 and a viewing surface of the display device. The lenticular lenses 404 of the lenticular film 402 may be separately formed on the base film 402, or may be integrally formed with the base film 402.

For example, the base film 402 may be formed of a plastic material such as polyethylene terephthalate (PET) and/or polycarbonate (PC), or a glass material, and the lenticular lenses 404 may be formed by coating and casting a curable material on the base film 402. The curable material may be a photosensitive acrylic acid resin solution, e.g., tetrahydrofurfuryl acrylate, camphorquinone, 1,6-hexanediol diacrylate, and/or ethyl-4-dimethylamino benzoate, without being limited thereto.

A liquid crystal panel 500 may be disposed on or above the lenticular film 400. In other words, as will be apparent to a person of ordinary skill in the art from the foregoing description and from the drawings, the liquid crystal panel 500 may be between the lenticular film 400 and the viewing surface of the display device. The liquid crystal panel 500 is a panel in which liquid crystal, e.g., twisted nematic (TN) or optically compensated bend (OCB) liquid crystals, are injected between upper and lower substrates thereof. The liquid crystal panel 500 may be an active matrix liquid crystal panel, which is driven by thin film transistors (TFTs) or thin film diodes (TFDs), or a passive matrix liquid crystal panel. The upper and lower substrates may be glass substrates or plastic substrates.

The aforementioned autostereoscopic three-dimensional display device may display three-dimensional images in a visible region through time division driving. For example, the light L1 for the left visual field and the light L2 for the right visual field may alternately pass through the liquid crystal panel 500 and may be synchronized with images of the liquid crystal panel, which allow an observer to view three-dimensional images.

Figure 3:
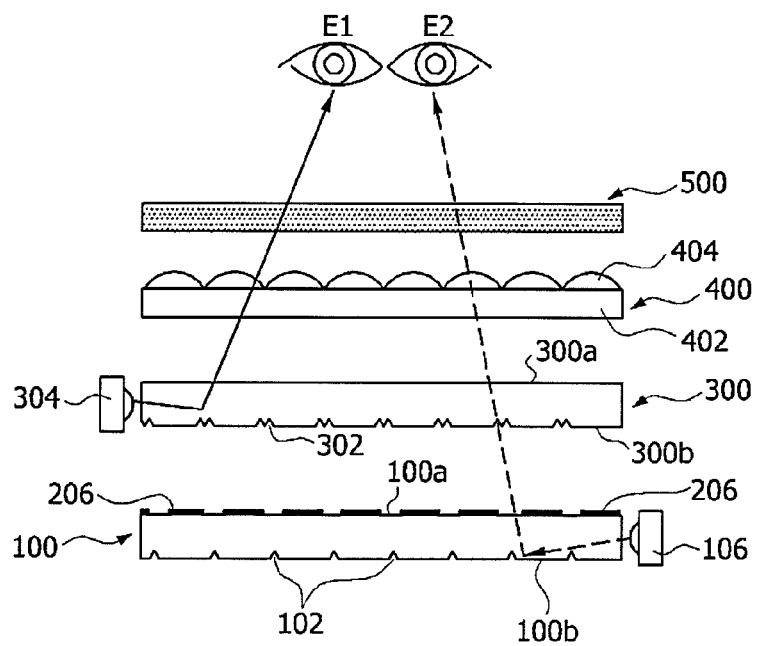
FIG. 3 illustrates a schematic sectional view of an autostereoscopic three-dimensional display device according to an embodiment.

FIG. 3 illustrates a schematic sectional view of an autostereoscopic three-dimensional display device according to an embodiment. As shown, the autostereoscopic three-dimensional display device according to the present embodiment may include the first light guide plate 100, a barrier film 206, the second light guide plate 300, the lenticular film 400, and the liquid crystal panel 500. Hereinafter, the present embodiment will be described with reference to FIG. 3, and a repeated description of the same components as those of the above embodiment may be omitted or simplified.

The barrier film 206 may be obtained by coating a barrier layer on the first surface 100a of the first light guide plate 100. For example, the barrier film 206 may be the barrier layer itself. The barrier film 206 may be formed by, e.g., sputtering, vacuum evaporation, or chemical vapor deposition. The barrier layer may be an absorption layer or a reflective layer, e.g., a reflective layer. The reflective layer may have a reflectivity of 90% or more. The reflective layer may have a single layer or multilayer structure formed of a metallic material, e.g., gold, silver, and/or aluminum, or may be a multilayered thin film in which an oxide film of high refractivity and an oxide film of low refractivity are stacked a plurality of times. The oxide film may be formed of, e.g., titanium dioxide ($TiO_2$), silicon dioxide ($SiO_2$), or tantalum pentoxide ($Ta_2O_5$), without being limited thereto. The reflective layer may have a reflectivity of 90% or more.

In an implementation, lenticular lenses 404 of the lenticular film 400 and a third surface 300a of the second light guide plate 300 may be disposed to face each other, but in other implementations may be disposed not to face each other, as shown in FIG. 3.

The first light source 106 may be placed on one side of the first light guide plate 100, and the second light sources 304 may be placed on one side of the second light guide plate 300. The first light source 106 and the second light source 304 may be, e.g., light emitting diodes and cold cathode fluorescent lamps (CCFLs). Alternatively, the first light source 106 may be placed on one side (e.g., left side of FIG. 3) of the first light guide plate 100, and the second light source 304 may be placed on another side (e.g., right side of FIG. 3) of the second light guide plate 300.

Although not shown in the drawing, a reflection plate may be placed below the first light guide plate 100. The reflection plate may reflect light exiting downwardly from the first light guide plate 100 back toward the first light guide plate 100. In an implementation, an antireflective coating may be coated on the first surface 100a and the second surface 100b of the first light guide plate 100, the third surface 300a and the fourth surface 300b of the second light guide plate 300, and/or the surface of the base film 402 of the lenticular film on which the lenticular lenses are not formed.

Figure 4:
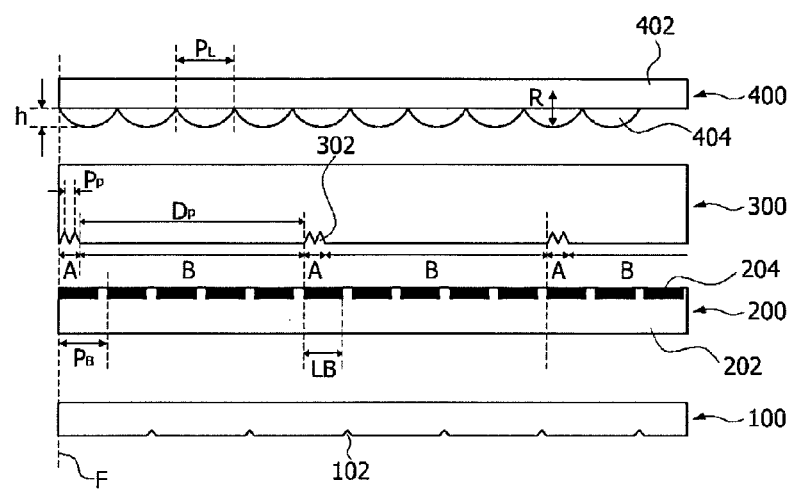
FIG. 4 illustrates a schematic sectional view of an autostereoscopic three-dimensional display device according to an embodiment.

FIG. 4 illustrates a schematic sectional view of an autostereoscopic three-dimensional display device according to an embodiment. In FIG. 4, $P_L$ denotes a pitch of lenticular lenses, R denotes a radius of the lenticular lenses, h denotes a height of the lenticular lenses, $P_P$ denotes a pitch of second prisms on a second light guide plate, $D_P$ denotes a length (width) of a space section of the second light guide plate, and $P_B$ denotes a barrier pitch.

As shown, the autostereoscopic three-dimensional image display device of the present embodiment may be manufactured by aligning the barrier film 200, the second light guide plate 300, and the lenticular film 400 with respect to one side thereof. For example, as shown in FIG. 4, the barrier film 200, the second light guide plate 300, and the lenticular film 400 may be aligned with respect to a line F, and may be aligned with respect to the other side opposite to the line F. Moreover, a separate alignment mark may be formed thereon, and the barrier film 200, the second light guide plate 300, and the lenticular film 400 may be aligned with respect to the other alignment mark. In this way, only the barrier film 200, the second light guide plate 300, and the lenticular film 400 may need to be aligned. Thus, the image display device may be manufactured through a simple manufacturing and may be advantageously applicable to a large size display device. The first light guide plate 100 may also be or may not be aligned.

The fourth surface 300b of the second light guide plate 300 may include a prism section A (having one or more second prisms 302) and a space section B (having no second prisms 302 and, e.g., being between the prism sections A when there are a plurality of prism sections A). In this way, the second prisms 302 may not be continuously formed. Thus, a Moiré pattern (caused by interference with the barrier film 200, the first prisms 102 of the first light guide plate 100, and liquid crystal cells) may be reduced and/or prevented. In an implementation, the prism section A may have a length of about 1% to about 50%, e.g., about 5% to 50%, of the barrier pitch $P_B$. In addition, a number of second prisms 302 on the prism section A may range from 1 to 9. Within these ranges of the length of the prism section A and the number of second prisms 302, excellent uniformity may be obtained.

In addition, the prism section A of the second light guide plate 300 may be formed of two or more second prisms 302 arranged at a predetermined pitch $P_P$. In an implementation, the second prisms of the second light guide plate 300 may have a pitch $P_P$ of about 0.01 mm to about 0.1 mm, e.g., about 0.02 mm to about 0.06 mm. In addition, the space section B of the second light guide plate may have a length $D_P$ of about 1 to 10 times, e.g., 3 to 7 times, the barrier pitch $P_B$. Within these ranges, excellent uniformity may be obtained.

The barrier film 200 may be periodically formed of barrier layers 204 arranged at the barrier pitch $P_B$. In an implementation, the barrier pitch $P_B$ may be about 0.5 mm to 1.0 mm, e.g., about 0.6 mm to 0.9 mm. The barrier layers 204 may have a length (width) $L_B$ of about 30% to about 75% of the barrier pitch $P_B$, e.g., about 50% to about 75%. Within the given ranges of the barrier pitch $P_B$ and the length $L_B$ of the barrier layers 204, excellent uniformity may be obtained while also beneficially reducing crosstalk.

The lenticular lenses on the lenticular film may be periodically arranged at a pitch $P_L$ and. In an implementation, the lenticular lenses may have a pitch $P_L$ of about 0.5 mm to about 1.0 mm, e.g., about 0.6 mm to about 0.9 mm. To focus light in the visible region, the pitch $P_L$ of the lenticular lenses of the lenticular film may be set to be greater or smaller than the barrier pitch $P_B$ within a preset range.

For example, the pitch $P_L$ of the lenticular lenses may be represented by Equation 1, below.

$$\text{Lenticular lenses pitch } P_L = \text{Barrier pitch } P_B \pm D. \quad \text{[Equation 1]}$$

In Equation 1, $D=P_B/[2\times(\text{a total number of lenticular lenses})]$

In an implementation, the pitch $P_L$ of the lenticular lenses may be about 0.0010 mm to 0.0020 mm greater or smaller than the barrier pitch $P_B$, e.g., about 0.0012 mm to about 0.0017 mm or about 0.0014 mm to about 0.0016 mm greater or smaller than the barrier pitch $P_B$.

The lenticular lenses may have a radius R represented by Equation 2, below $$R = \frac{h^2 + (P_L/2)^2}{2h} \quad \text{[Equation 2]}$$

In Equation 2, $P_L$ denotes a pitch of lenticular lenses and h denotes a height of the lenticular lenses.

A ratio $h/P_L$ of the height of the lenticular lenses to the pitch of the lenticular lenses may be about 0.13 to about 0.27, and a ratio $R/P_L$ of the radius of the lenticular lenses to the pitch of the lenticular lenses may be about 0.6 to about 1.0. Light may be uniformly focused in the visible region within the given ranges of the pitch and the radius of the lenticular lenses.

The first light guide plate 100 may be formed of or with the first prisms 102. The first prisms 102 may be regularly or irregularly arranged, and a number and/or distribution of first prisms 102 are not particularly limited.

Figure 5:
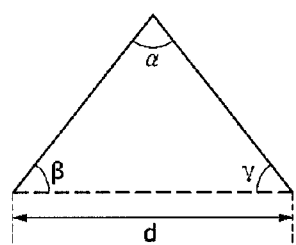
FIG. 5 illustrates a sectional view of a prism according to an embodiment.

FIG. 5 illustrates a sectional view of a prism according to an embodiment. As shown, first and second light guide plates 100, 300 according to the embodiments may include a plurality of prisms. First prisms of the first light guide plate 100 and second prisms of the second light guide plate 300 may have the same shape or different shapes.

The prisms may have, e.g., a regular triangle shape, an isosceles triangle shape, or other triangular shapes. In an implementation, the prisms may have an isosceles triangle shape. In an implementation, the prisms may have an isosceles triangle shape, which has an apex angle α of about 60 to 100 degrees and base angles β and γ of about 40 to 60 degrees. Moreover, the prisms may have a bottom side which has a length d of about 0.02 mm to about 0.06 mm.

Figure 6:
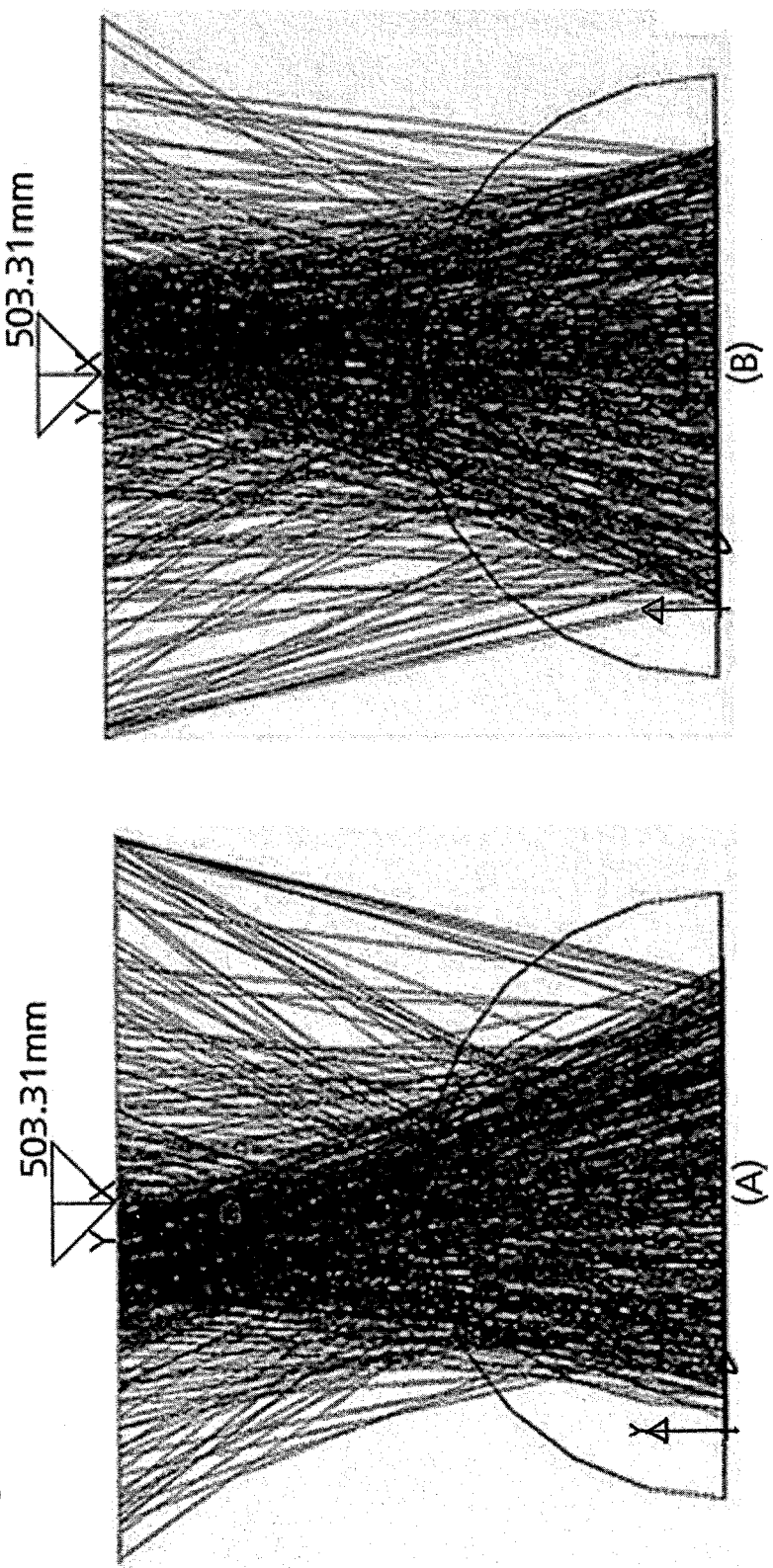
FIG. 6 illustrates graphs depicting light output distribution of a first light guide plate and a second light guide plate.

FIG. 6 illustrates graphs depicting light output distribution of a first light guide plate and a second light guide plate. For example, FIG. 6(A) illustrates a graph depicting light output distribution of the second light guide plate and FIG. 6(B) illustrates a graph depicting light output distribution of the first light guide plate. The graphs depicting light output distribution correspond to simulation results obtained by switching on/off the light sources of the first and the second light guide plates, respectively, and correspond to simulation results in a state in which the lenticular film and the barrier film are included in the image display device. As shown, it may be seen that the first and the second light guide plates have different pointing angles. The graphs were obtained by simulation using optical simulation software LightTools of ORA (Optical Research Associates). In the simulation, the thickness of the first and the second light guide plates was set to 3 mm, the apex angle of the prisms was set to 80 degrees, the pitch $P_P$ of the second prisms of the second light guide plate was set to 0.04 mm, the length $D_P$ of the spaces was set to 3.6575 mm, the number of second prisms of the prism section A was set to 2, and the length of the bottom side of each of the prisms was set to 0.04 mm.

Figure 7:
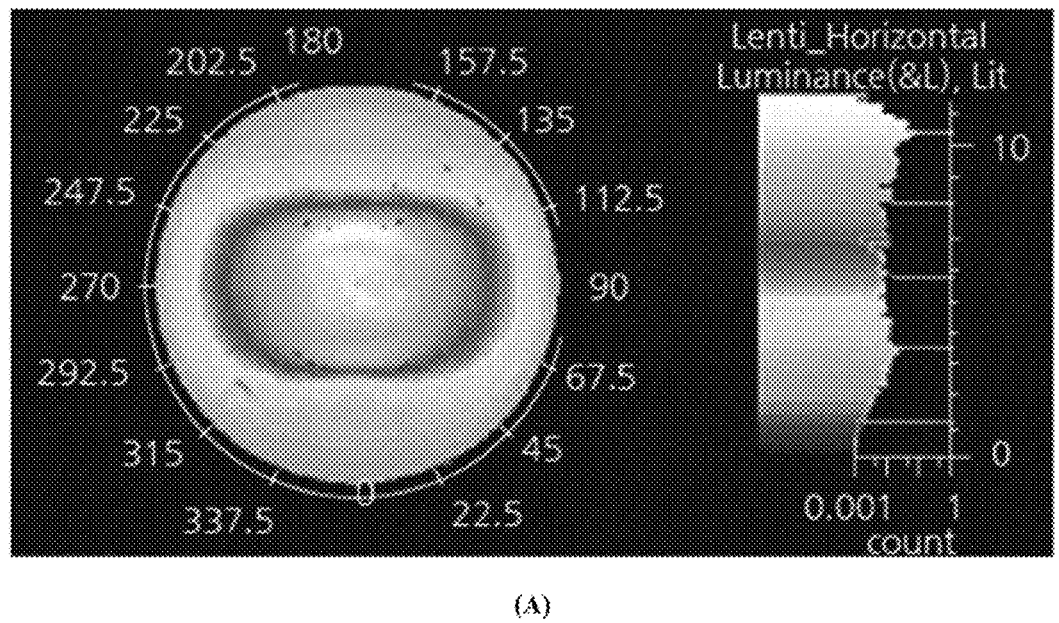
FIG. 7 illustrates graphs depicting angular luminance of the first light guide plate and the second light guide plate.
Figure 7:
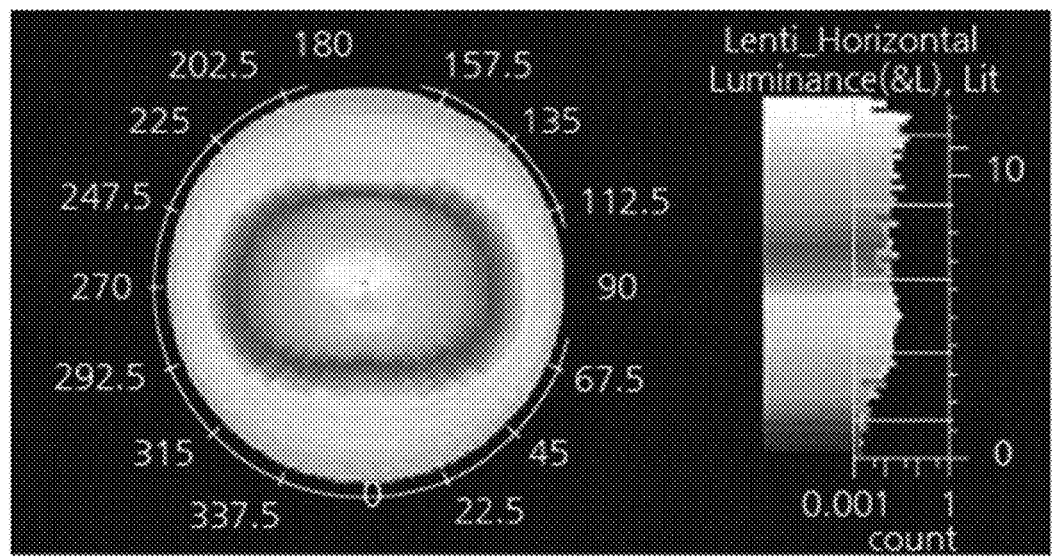

FIG. 7 illustrates graphs showing angular luminance of the first light guide plate and the second light guide plate. For example, FIG. 7(A) illustrates a graph showing angular luminance of the second light guide plate and FIG. 7(B) illustrates a graph showing angular luminance of the first light guide plate. The graphs depicting angular luminance are simulation results obtained by switching on/off the light sources of the first and the second light guide plates, respectively, and performing measurement in a state in which the lenticular film and the barrier film are included. As shown in FIG. 7, it may be seen that the first and second light guide plates exhibit similar angular luminance. In the measurement, the thickness of the first and the second light guide plates was set to 3 mm, the apex angle of the prisms was set to 80 degrees, the pitch $P_P$ of the second prisms of the second light guide plate was set to 0.04 mm, the length $D_P$ of the space section was set to 3.6575 mm, the number of second prisms of the prism section was set to 2, and the length of the bottom side of each prisms was set to 0.04 mm.

FIG. 8 illustrates a graph depicting a final visual field of the autostereoscopic three-dimensional display device according to an embodiment. (A) is for the second light guide plate and (B) is for the first light guide plate. In the graph, characteristics were estimated using brightness at a location separated a distance of 32.5 mm from the center, and it may be seen that left and right visual fields were readily separated and light was directed toward a predetermined side. This means that light for a left visual field and light for a right visual field may be accurately directed to viewing points, and thus it may be seen that the autostereoscopic three-dimensional display device according to an embodiment may be suitable for embodying the three-dimensional display device. In the measurement, the thickness of the first and the second light guide plates was set to 3 mm, the apex angle of the prisms was set to 80 degrees, the pitch $P_P$ of the second prisms of the second light guide plate was set to 0.04 mm, the length $D_P$ of the space section was set to 3.6575 mm, the number of second prisms of the prism section was set to 2, and the length of the bottom side of each prism was set to 0.04 mm. The pitch $P_L$ of the lenticular lenses was set to 0.746 mm, the radius of the lenticular lenses was set to 0.6987 mm, and the barrier pitch $P_B$ was set to 0.7475 mm.

By way of summation and review, three-dimensional images are created on the eye of a viewer by a principle of stereo vision, and binocular parallax, which occurs when both eyes of a viewer are separated from each other by a distance of about 65 mm, is an important factor for the 3D effect. The 3D display devices based on binocular parallax may be classified into stereoscopic types and autostereoscopic types. The stereoscopic types may include a polarization-glasses type and a shutter-glasses type. Since the stereoscopic types disadvantageously require users to wear glasses, studies have been increasingly made to develop autostereoscopic type three-dimensional display devices. The auto-stereoscopic types include a lenticular lens type, a parallax barrier type, and a liquid crystal shutter type.

A lenticular stereo developed in 1932, e.g., a lenticular lens type three-dimensional display device, has not been used for a long time due to insufficient processing and material technologies. With development of precision processing technology, plastics industry, and photo/printing technology, the lenticular lens type has attracted attention.

3D display devices may have a structure in which a lenticular lens and a prism pattern are combined. FIG. 1 illustrates a conceptual view of an operation principle of one type of three-dimensional display device. Referring to FIG. 1, in the auto-stereoscopic 3D display device, first and second light sources 12, 14 may be placed at opposite sides of a light guide plate 16, a 3D film 18 (having a combination of a lenticular lens and a prism pattern) may be disposed above the light guide plate 16, and a liquid crystal panel may be disposed above the 3D film. Light emitted from the first and second light sources 12, 14 may be reflected and refracted while passing through the light guide plate 16 and the 3D film 18, and then may be focused on a left eye E1 and a right eye E2 to create an image.

Such a 3D display device may require that a film in which a lenticular lens and a prism pattern are integrated be very precisely manufactured, and manufacturing tolerance may increase with increasing size of the display device, thereby making it difficult to achieve alignment. Moreover, the 3D display device may have a complicated structure and low resolution. For the auto-stereoscopic 3D display device, crosstalk between viewing points is an important performance parameter. Crosstalk means that some of an unintended viewing point image is shown, even in the case where observation is performed at a designated viewing point location. Such crosstalk may seriously deteriorate the 3D effect experienced by the observer. Such a 3D display device may be vulnerable to crosstalk. In addition, a lenticular lens having a very regular pattern on a front (rear) side of the display panel, a prism pattern, and a regular pixel pattern of the display panel may interfere with each other, causing an undesirable Moiré pattern.

The embodiments provide an autostereoscopic three-dimensional image display device that includes an upper light guide plate and a lower light guide plate, e.g., two light guide plates, a barrier film between the upper and lower light guide plates, and a lenticular film on the upper light guide plate side, and is configured to easily achieve a large area display, to enhance uniformity, and to prevent crosstalk and a Moiré pattern.

The embodiments provide an autostereoscopic three-dimensional image display device which has a simple structure, employs a simple manufacturing method, and easily achieves large area display at low cost.

The embodiments also provide an autostereoscopic three-dimensional image display device that prevents crosstalk and a Moiré pattern, achieves high resolution, and provides a high quality image.

According to the embodiments, the autostereoscopic three-dimensional image display device is configured to allow simple alignment of a lenticular film and a barrier film, thereby simplifying a manufacturing process and allowing achievement of a large area display.

In addition, according to the embodiments, the autostereoscopic three-dimensional image display device may help prevent crosstalk and a Moiré pattern through the structure and arrangement of prism section and a barrier film. Further, the autostereoscopic three-dimensional image display device may provide high resolution and a high quality image.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An autostereoscopic three-dimensional image display device, comprising:
    a first light guide plate having a first surface and a second surface opposite to the first surface, the second surface being provided with first prisms that changes a path of light input from a first light source on a lateral side of the first light guide plate toward the first surface;
    a second light guide plate having a third surface and a fourth surface opposite to the third surface, the fourth surface being provided with second prisms that changes a path of light input from a second light source on a lateral side of the second light guide plate toward the third surface;
    a barrier film between the first light guide plate and the second light guide plate, the barrier film interrupting part of light from the first light guide plate; and
    a lenticular film above the third surface of the second light guide plate, the lenticular film refracting a path of light from the second light guide plate.

2. The autostereoscopic three-dimensional image display device as claimed in claim 1, wherein the fourth surface includes:
    a prism section having one or more second prisms, and
    a space section having no second prism.

3. The autostereoscopic three-dimensional image display device as claimed in claim 2, wherein a number of second prisms in the prism section is from 1 to 9.

4. The autostereoscopic three-dimensional image display device as claimed in claim 2, wherein the barrier film includes a periodically repeated structure of alternating barrier layers and transmittance regions.

5. The autostereoscopic three-dimensional image display device as claimed in claim 4, wherein the prism section has a length of about 1% to about 50% of a barrier pitch of the barrier film.

6. The autostereoscopic three-dimensional image display device as claimed in claim 4, wherein the barrier layers have a length of about 30% to about 75% of a barrier pitch of the barrier film.

7. The autostereoscopic three-dimensional image display device as claimed in claim 4, wherein the space section has a length of about 1 to about 10 times a barrier pitch of the barrier film.

8. The autostereoscopic three-dimensional image display device as claimed in claim 4, wherein the lenticular film includes lenticular lenses having a pitch PL represented by Equation 1:

$$P_L = P_B \pm D, \qquad \text{[Equation 1]}$$

where $P_B$=a barrier pitch of the barrier film and $D=P_B/2\times$(a total number of lenticular lenses).

9. The autostereoscopic three-dimensional image display device as claimed in claim 1, wherein the barrier film includes:
   a base substrate, and
   a reflective layer on the base substrate.

10. The autostereoscopic three-dimensional image display device as claimed in claim 1, wherein the barrier film has a barrier layer coated on the first surface of the first light guide plate.

11. The autostereoscopic three-dimensional image display device as claimed in claim 1, wherein the second prisms have a pitch of about 0.01 mm to about 0.1 mm.

12. The autostereoscopic three-dimensional image display device as claimed in claim 1, wherein the first prisms or the second prisms have an apex angle of about 60 to 100 degrees.

13. The autostereoscopic three-dimensional image display device as claimed in claim 1, wherein the first prisms and the second prisms have a same shape.

14. The autostereoscopic three-dimensional image display device as claimed in claim 1, wherein the barrier film includes a reflective layer, the reflective layer being a multilayered reflective layer in which a metal reflective layer or an oxide film of high refractivity and an oxide film of low refractivity are alternately stacked.

15. The autostereoscopic three-dimensional image display device as claimed in claim 1, wherein the first light source or the second light source is a light emitting diode or a cold cathode fluorescent lamp.

16. The autostereoscopic three-dimensional image display device as claimed in claim 1, further comprising a liquid crystal panel above the lenticular film.

17. The autostereoscopic three-dimensional image display device as claimed in claim 1, wherein the first prisms or the second prisms each have a bottom side having a length of about 0.02 mm to 0.06 mm.

18. The autostereoscopic three-dimensional image display device as claimed in claim 1, wherein the lenticular film includes lenticular lenses having a radius R represented by Equation 2:

$$R = \frac{h^2 + (P_L/2)^2}{2h} \quad \text{[Equation 2]}$$

where $P_L$ is a pitch between the lenticular lenses and h is a height of the lenticular lenses.

19. The autostereoscopic three-dimensional image display device as claimed in claim 1, wherein the lenticular film includes lenticular lenses having a ratio $h/P_L$ of a height to a pitch of about 0.13 to about 0.27.

20. The autostereoscopic three-dimensional image display device as claimed in claim 1, wherein the lenticular film includes lenticular lenses having a ratio $R/P_L$ of a radius to a pitch of about 0.6 to about 1.0.

21. The autostereoscopic three-dimensional image display device as claimed in claim 1, wherein the barrier film has a barrier pitch of about 0.5 mm to 1.0 mm.

* * * * *